Dec. 10, 1940.   R. A. GILBERT   2,224,598
QUICK CHANGE ELECTRODES
Filed Nov. 25, 1938   2 Sheets-Sheet 1

Inventor:
Ralph A. Gilbert,
by Harry E. Dunham
His Attorney.

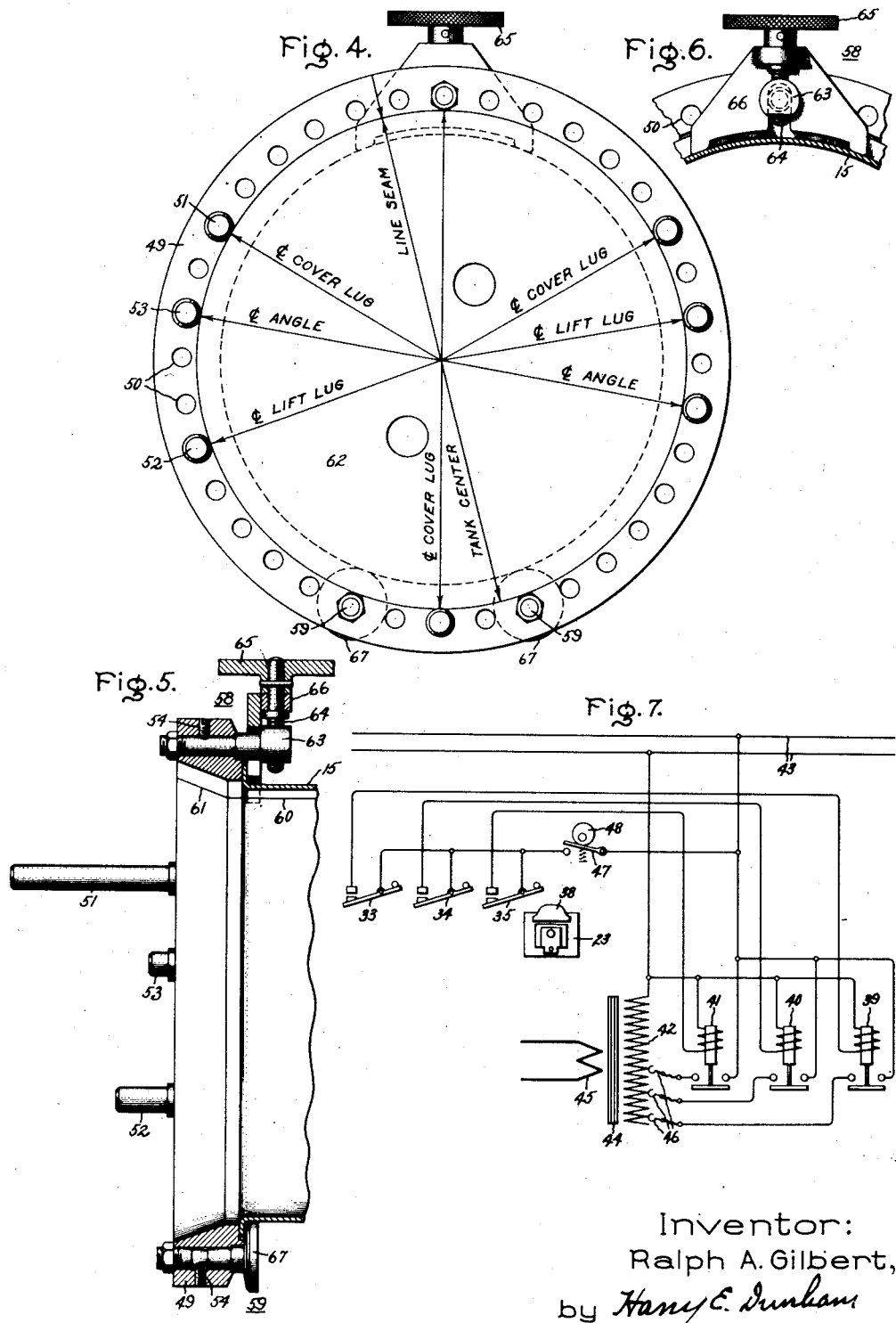

Patented Dec. 10, 1940

2,224,598

UNITED STATES PATENT OFFICE 2,224,598

QUICK CHANGE ELECTRODES

Ralph A. Gilbert, Pittsfield, Mass., assignor to General Electric Company, a corporation of New York Application November 25, 1938, Serial No. 242,266

13 Claims. (Cl. 219—4)

My invention relates to resistance welding apparatus for sequentially performing a plurality of different welding operations.

It is frequently necessary to perform on one article different welding operations and in the past it has been the general practice to perform like operations on one machine and pass the article from machine to machine until all the different operations had been performed or to use a different set-up on one machine for the different welding operations each of which is completed on all the articles before another operation is started.

These procedures require either a large number of welding machines or protracted periods of inactivity for the welding operator while a single machine is being set up for the various welding operations.

It is an object of my invention to provide apparatus suitable for sequentially performing a plurality of welding operations in a single machine.

It is a further object of my invention to provide a welding machine with a plurality of electrodes each of which is adapted to perform a different welding operation and each of which in its welding position is automatically supplied with an amount of welding current particularly suited to the welding operation for which each electrode is adapted.

It is another object of my invention to provide a counter electrode having substantially different work engaging surfaces which cooperate with each of the work engaging surfaces of a plurality of electrodes each of which is adapted to perform a different welding operation.

It is another object of my invention to provide as part of the welding apparatus a work engaging fixture having index means cooperating with a stop located relative to a welding electrode in its welding position for correctly positioning the work relative to the electrode when performing a predetermined welding operation.

Further objects of my invention will become apparent from a consideration of the embodiment thereof illustrated in the accompanying drawings.

Figure 1:
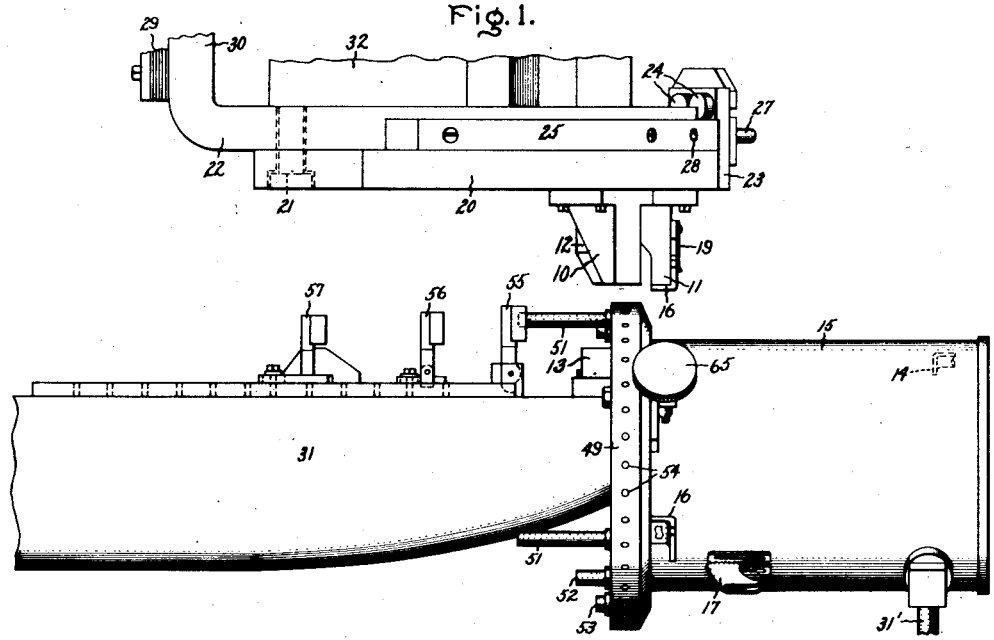
Figure 2:
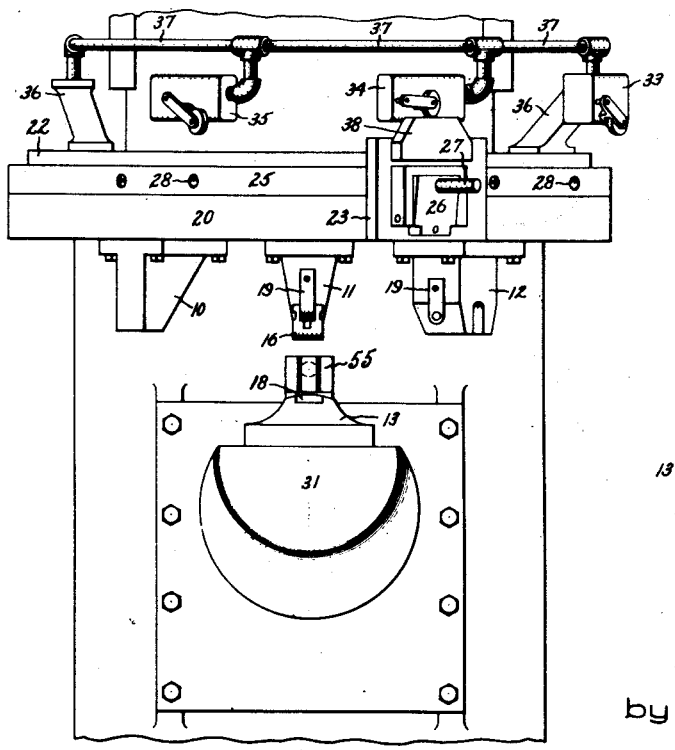
Figure 3:
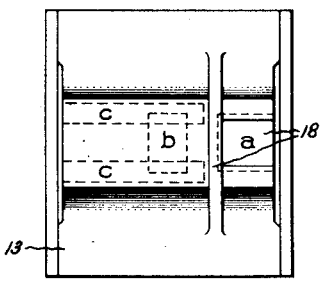

In these drawings, Fig. 1 is a side view and Fig. 2 is a front view of welding apparatus in accordance with my invention wherein three different electrodes are adjustably positioned relative to a counterelectrode, a plan view of which is shown in Fig. 3; Figs. 4 and 5 are end and side sectional views of a work fixture for positioning the work relative to the electrodes as shown in Fig. 1; Fig. 6 is a detail view of the clamp forming part of the fixture of Figs. 4 and 5; and Fig. 7 is a wiring diagram illustrating the connection of the control switches illustrated in Fig. 2 by means of which the proper amount of welding current is supplied to the three different electrodes illustrated in Figs. 1 and 2.

In the resistance welding machine illustrated in the drawings, a plurality of electrodes 10, 11 and 12 are adjustably positioned over a cooperating or counterelectrode 13 in order to perform three different projection welding operations. The electrode 10 is adapted for welding angles 14 to the inside surface of a transformer tank 15, and the electrodes 11 and 12 are respectively adapted for welding cover lugs 16 and lifting lugs 17 to the outside surface thereof. The counterelectrode 13 is provided with recesses 18 adapted to hold the angles 14 and the electrodes 11 and 12 are provided with holding clips 19 for positioning thereon the cover lugs 16 and lifting lugs 17. Each of the electrodes 10, 11 and 12 has a work engaging surface that is adapted to engage a substantially different portion of the work engaging surface of the counterelectrode 13. As indicated in Fig. 3, the electrode 10 engages the area a, electrode 11 engages the area b, and the electrode 12 engages the areas c of the counterelectrode 13.

Electrodes 10, 11 and 12 are attached to the lower surface of a sector-shaped plate 20 which is pivotally attached at 21 to a sector-shaped terminal plate 22. Plates 20 and 22 are formed of copper or some similar material of good electrical conductivity and a substantial portion of the upper surface of the plate 20 makes an electrical contact with a substantial area of the lower surface of the plate 22. An arm 23 attached to the plate 20 and extending over the edge portion of the plate 22 is provided with a plurality of rolls 24 which engage a track 25 secured to the outer periphery of the plate 22. This track is made of steel or some other wear resisting material and through the agency of rolls 24 and arm 23 acts as a support for the outer edge portion of the plate 20. The arm 23 is also provided with a latch 26 having a handle 27 on its exterior surface and a dowel pin (not shown) on its inside surface. This dowel pin is adapted to engage dowel holes 28 in track 25 when the electrodes 10, 11 and 12 are properly positioned over the counterelectrode 13. The electrodes 10, 11 and 12 are moved into desired positions over the counterelectrode 13 by rotating the plate 20 relative to the plate 22 through the agency of the handle 27 attached to the latch 26. This latch is normally biased to a position holding the dowel pin thereon in the dowel holes 28 above referred to.

Welding current is supplied to the electrodes 10, 11 and 12 through the plates 20 and 22 from one terminal 29 of the secondary of a welding transformer which is connected to terminal portion 30 of the plate 22. Welding current is also supplied to the counterelectrode 13 through a supporting arm 31 which is connected to the other terminal of the secondary of the welding transformer. The arm 31 forms a part of the welding machine which is provided with a ram 32 to the lower end of which the plates 20 and 22 and the electrodes 10, 11 and 12 are attached. The reciprocation of the ram 32 relative to the arm 31 applies welding pressure to the work inserted between cooperating electrodes. The tank 15 is supported during welding on electrode 13 and a supporting standard 31'.

Each electrode 10, 11 and 12 in its welding position is automatically connected to a source of welding current particularly suited for the welding operation to be performed thereby. This is accomplished through the agency of cam operated switches 33, 34 and 35 supported on plate 22 by brackets 36 and conduits 37 within which the control wires for these switches are located. Switches 33, 34 and 35 are operated by cam 38 attached to the arm 23 which moves with the sector plate 20 in locating the electrodes 10, 11 and 12 in their welding positions. As shown in the diagram of Fig. 7, switches 33, 34 and 35 when closed selectively energize relays 39, 40 and 41 which through their associated contacts vary the number of primary windings 42 of the welding transformer connected to the source of supply 43. By thus varying the number of primary windings, the proper amount of welding current is supplied by the welding transformer 44 through its secondary 45 to cooperating electrodes. It is to be noted that the number of primary turns energized through the relays 39, 40 and 41 is made adjustable through the agency of adjustable contacts 46.

The control circuit for the relays 39, 40 and 41 also includes a cam operated switch 47 which is opened and closed by cam 48, the arrangement being such that the control circuit is closed after cooperating electrodes have engaged the work inserted therebetween and is opened before these electrodes are removed from the work through the agency of the reciprocated ram 32.

The tank 15 is positioned relative to cooperating electrodes through the agency of a fixture 49 attached thereto. This fixture is provided with a plurality of equally spaced openings 50 in which the shank or supporting terminal portions of indexing pins 51, 52 and 53 are clamped by set screws 54 located in the outside periphery of the ring. These pins are of different predetermined lengths and when in engagement with stops 55, 56 and 57 position the tank 15 relative to cooperating electrodes so that the parts 14, 16 and 17 are welded to the tank in desired locations. For example, when the pin 51 engages the stop 55 the cover lugs 16 are properly located. When the pins 53 engage the stop 57 the angles 14 are properly located, and when the pins 52 engage the stop 56 the lifting lugs 17 are properly located. As illustrated, stops 55 and 56 may be folded down toward the right in order to uncover the stop 57. These stops are adjustably supported on the arm 31 of the welding machine. They may be attached directly thereto or through the intermediary of a support plate on which they are mounted as illustrated in the drawings.

The ring 49 is attached to the tank 15 by a clamp 58 which cooperates with two flanged clamping dogs 59. The clamp and clamping dogs are adjustably positioned in the openings 50 of the ring 49 in positions such that they do not interfere with the indexing pins 51, 52 and 53 also supported in these openings of the ring. As shown in Fig. 5, the ring 49 is provided with a recess within which the turned-over edge of the tank 15 is located and the clamp and dogs engage the outside of the tank surface on the other side of this turned-over edge. The tank is properly located in the ring by positioning a marked portion of the tank, for example the back seam 60 thereof, opposite a reference mark 61 on the ring. The proper location of the indexing pins 51, 52 and 53 in the ring 49 may be obtained through the use of a templet 62 such as illustrated in Fig. 4.

As illustrated in Figs. 5 and 6, the clamp 58 comprises a bolt 63 whose shank is supported in the ring 49. The head of the bolt is threaded for the reception of a feed screw 64 provided with a handle 65 by means of which a clamping member 66 also supported thereon is forced into engagement with the tank 15. The dogs 59 have eccentric head portions 67 and by properly locating the dogs 59 in the ring 49 with regard to their eccentric heads 67, the tank 15 may be accurately centered in the ring when secured thereto through the agency of the dogs 59 and the clamp 58.

In view of the above description the manner in which the welding apparatus is employed is believed to be obvious. Briefly, it is as follows: The tank 15 is located in the ring 49 which is clamped thereto. This ring having the indexing pins 51, 52 and 53 properly located therein positions the tank 15 relative to cooperating electrodes when these pins engage stops 55 and 57. With the work thus properly located, the electrode for performing each welding operation is swung into position over its cooperating or counterelectrode thereby actuating one of the switches 53, 54 and 55 which automatically connects the proper amount of welding current thereto.

It is apparent that, according to the work and the welding operations to be performed, various fixtures provided with various arrangements of index members may be used in following the teachings of my invention. It is also apparent that special electrodes may be associated in many ways with the other parts of the welding machine so that they can be moved into and out of welding position. Furthermore, arrangements other than those disclosed may be employed for connecting to a pair of cooperating electrodes the proper amount of welding current for the operation to be performed thereby.

In view of the fact that many variations and modifications of the invention above described will occur to those skilled in the art, it is intended in the appended claims to cover all such variations and modifications as come within the true spirit and scope of my invention.

What I claim as new and desire to secure by Letters Patent of the United States is:

1. Resistance welding apparatus comprising a plurality of electrodes each of which is adapted to perform a different welding operation, means for selectively moving any one of said electrodes into a welding position, and means responsive to the movement of any one of said electrodes into its welding position for supplying thereto a predetermined amount of welding current particularly suited for performing the welding operation for which it is adapted.

2. Resistance welding apparatus comprising a plurality of electrodes each of which is adapted to perform a different welding operation, means for selectively moving any one of said electrodes into a welding position, sources of welding current suitable for performing the welding operations for which each of said electrodes is adapted, and means responsive to the movement of any one of said electrodes into its welding position for connecting the proper source of welding current thereto.

3. Resistance welding apparatus comprising a plurality of electrodes each of which is adapted to perform a different welding operation, sources of welding current suitable for performing the welding operations for which each of said electrodes is adapted, a movable support for said electrodes, means for moving said support to locate any one of said electrodes in its welding position, and means responsive to the movement of said support and including a cam and a plurality of switches positioned in the path of movement of said cam for connecting the proper source of welding current to each electrode when it is located in its welding position.

4. Resistance welding apparatus comprising a plurality of electrodes each of which is adapted to perform a different welding operation in conjunction with a common counterelectrode, means for selectively positioning each of said plurality of electrodes in a welding position opposite said counterelectrode, and means responsive to the movement of said positioning means for adjusting in accordance with the welding operation to be performed the amount of welding current supplied to each of said plurality of electrodes when it is in its welding position.

5. Resistance welding apparatus comprising an electrode, a fixture having a plurality of index members supported thereon, means for attaching said fixture in a predetermined position on an article to be welded, and means including a stop selectively engaged by said index members for positioning said fixture and said article relative to said electrode.

6. Resistance welding apparatus comprising an electrode, a fixture having a plurality of index members supported thereon, means for locating said fixture on an article to be welded and for attaching it thereto, and means including a stop selectively engaged by said index members for positioning said fixture and said article relative to said electrode.

7. Resistance welding apparatus comprising an electrode, a fixture, means for clamping said fixture in a predetermined position on an article to be welded, a plurality of index members, means for attaching said index members to said fixture in predetermined positions thereon, and means including a stop selectively engaged by each of said index members for positioning said fixture and said article relative to said electrode.

8. Resistance welding apparatus comprising an electrode, a fixture, means for clamping said fixture in a predetermined position on an article to be welded, a plurality of index members, means for locating said index members on said fixture in accordance with a plurality of welding operations to be performed on said article, means for attaching said index members in the desired locations on said fixture, and means including a stop selectively engaged by each of said index members for positioning said fixture and said article relative to said electrode.

9. Resistance welding apparatus comprising an electrode, a fixture, means for clamping said fixture in a predetermined position on an article to be welded, index means on said fixture, and means including a plurality of stops selectively movable into operative or inoperative positions and selectively engaged by said index means for positioning said fixture and said article relative to said electrode.

10. Resistance welding apparatus comprising an electrode, a fixture, means for clamping said fixture in a predetermined position on an article to be welded, a plurality of index pins of predetermined lengths, means for attaching said pins to said fixture in predetermined positions thereon, and means including a stop selectively engaged by each of said index pins for positioning said fixture and article relative to said electrode.

11. Resistance welding apparatus for securing attachments to a cylindrical shell comprising cooperating electrodes, a ring having a plurality of circumferentially spaced openings therein and having a diameter greater than the diameter of said cylindrical shell, means for centering and clamping said ring to the surface of said cylindrical shell, a plurality of index pins having projecting end portions of predetermined lengths and having terminal supporting portions adapted to be located in the openings in said ring, means for securing the terminal portions of said pins in the openings in said ring in accordance with a predetermined pattern, and means including a stop selectively engaged by the projecting end portions of said pins for positioning said cylindrical shell in a plurality of welding positions relative to said electrodes.

12. Resistance welding apparatus for securing attachments to a cylindrical shell comprising a fixed electrode, means including said fixed electrode for supporting said cylindrical shell, a ring having a plurality of circumferentially spaced openings therein and having an inside diameter greater than the diameter of said cylindrical shell, means mounted on said ring for centering and clamping it in a predetermined position on said cylindrical shell, a plurality of index pins having projecting portions of predetermined lengths and having terminal supporting portions adapted to be located in the openings in said ring, means for securing the terminal portions of said pins in the openings in said ring in accordance with a predetermined pattern, and a stop selectively engaged by each of said index pins for positioning said cylindrical shell relative to said electrode, said stop being located in a predetermined position relative thereto.

13. Resistance welding apparatus for securing attachments to a cylindrical shell comprising a fixed electrode, means including said fixed electrode for supporting said cylindrical shell, a plurality of electrodes each of which cooperates with said fixed electrode in performing a different welding operation when positioned opposite thereto, sources of welding current suitable for performing the welding operation for which cooperating electrodes are adapted, a shiftable support for positioning each of said plurality of electrodes in its welding position opposite said fixed electrode with its work engaging surface opposite a different portion of the work engaging surface of said fixed electrode, means for shifting said support to locate any one of said plurality of electrodes in its welding position opposite said fixed electrode, a cam mounted on said shiftable support, means including a plurality of switches positioned in the path of movement of said cam for connecting the proper source of welding current of each of said plurality of electrodes moved into cooperating position with said fixed electrode, means for moving said support toward and away from said fixed electrode to move cooperating electrodes toward and away from one another, a ring having a plurality of circumferentially spaced openings therein and having an inside diameter greater than the diameter of said cylindrical shell, means mounted on said ring for centering and clamping it in a predetermined position on said cylindrical shell, a plurality of index pins having projecting portions of predetermined lengths and having terminal supporting portions adapted to be located in the openings in said ring, means for securing the terminal portions of said pins in the openings in said ring in accordance with a predetermined pattern, and stop means selectively engaged by each of said index pins for positioning said cylindrical shell relative to cooperating electrodes, said stop means being located in a predetermined position relative to said fixed electrode.

RALPH A. GILBERT.